(12) United States Patent
Zhou et al.

(10) Patent No.: US 11,651,760 B2
(45) Date of Patent: May 16, 2023

(54) SIMULATION TEST SYSTEM AND METHOD FOR VEHICLE ROAD NOISE CANCELLATION

(71) Applicant: HARMAN INTERNATIONAL INDUSTRIES, INCORPORATED, Stamford, CT (US)

(72) Inventors: Tingting Zhou, Jiangsu (CN); Yuliu Cao, Jiangsu (CN); Shiyu Chen, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/502,748

(22) Filed: Oct. 15, 2021

(65) Prior Publication Data
US 2022/0122577 A1   Apr. 21, 2022

(30) Foreign Application Priority Data
Oct. 16, 2020 (CN) .......................... 202011110809.1

(51) Int. Cl.
*G06F 30/20* (2020.01)
*G10K 11/178* (2006.01)
*B60W 40/06* (2012.01)
*G06F 119/10* (2020.01)

(52) U.S. Cl.
CPC ....... *G10K 11/17854* (2018.01); *B60W 40/06* (2013.01); *G06F 30/20* (2020.01); *G10K 11/17817* (2018.01); *G10K 11/17823* (2018.01); *G10K 11/17881* (2018.01); *G06F 2119/10* (2020.01); *G10K 2210/1282* (2013.01); *G10K 2210/12821* (2013.01); *G10K 2210/3028* (2013.01); *G10K 2210/3052* (2013.01)

(58) Field of Classification Search
CPC ............ G10K 2210/3052; G06F 30/20; G06F 2119/10; B60W 40/06
See application file for complete search history.

(56) References Cited

U.S. PATENT DOCUMENTS

2019/0139531 A1* 5/2019 Kim ..................... G10K 11/178

FOREIGN PATENT DOCUMENTS

WO   WO-2019123345 A1 *  6/2019   ....... G10K 11/17854

* cited by examiner

*Primary Examiner* — Ping Lee
(74) *Attorney, Agent, or Firm* — Brooks Kushman P.C.

(57) ABSTRACT

A simulation test system and method for vehicle road noise cancellation (RNC) are provided in one or more embodiments of the present disclosure. The simulation test system may include a vehicle RNC simulation system and a power amplifier. The vehicle RNC simulation system is configured to simulate an RNC system in a vehicle environment. The power amplifier is configured to execute an RNC algorithm and may perform data communication with the vehicle RNC simulation system. The vehicle RNC simulation system transmits acceleration data representing an acceleration signal and microphone data representing a microphone signal to the power amplifier as inputs to the RNC algorithm in the power amplifier. Moreover, the vehicle RNC simulation system may receive speaker data representing a speaker signal from the power amplifier. The vehicle RNC simulation system includes a secondary path simulation model and a signal flow simulation model.

14 Claims, 12 Drawing Sheets

| ACC1 | ACC2 | ACC3 | ACC4 | ACC5 | ACC6 | ACC7 | ACC8 | ACC9 | ACC10 | ACC11 | ACC12 | MIC1 | MIC2 | MIC3 | MIC4 |
|---|---|---|---|---|---|---|---|---|---|---|---|---|---|---|---|
| MIC5 | MIC6 | MIC7 | MIC8 | N/A | N/A | N/A | N/A | N/A | N/A | N/A | N/A | N/A | N/A | N/A | N/A |

FIG. 10

| SPK1 | SPK2 | SPK3 | SPK4 | SPK5 | SPK6 | SPK7 | SPK8 | N/A | N/A | N/A | N/A | N/A | N/A | N/A | N/A |
|------|------|------|------|------|------|------|------|-----|-----|-----|-----|-----|-----|-----|-----|
| N/A  | N/A  | N/A  | N/A  | N/A  | N/A  | N/A  | N/A  | N/A | N/A | N/A | N/A | N/A | N/A | N/A | N/A |

SIMULATION TEST SYSTEM AND METHOD FOR VEHICLE ROAD NOISE CANCELLATION

CROSS-REFERENCE TO RELATED APPLICATIONS

This application claims priority to CN Application Serial No. 202011110809.1 filed Oct. 16, 2020, the disclosure of which is hereby incorporated in its entirety by reference herein.

TECHNICAL FIELD

The present disclosure relates to the field of noise cancellation, and more particularly, to a simulation test system and method for vehicle road noise cancellation (RNC).

BACKGROUND

With the continuous development of road noise cancellation (RNC) technology, more requirements are imposed on the development and debugging of the RNC technology. In order to verify the performance of the developed RNC technology, it is often necessary to conduct a performance test on an RNC algorithm in an actual vehicle driving environment. In order to carry out the performance test, for example, developers need to transplant the RNC algorithm to a power amplifier platform in the vehicle, and then verify whether the RNC algorithm works properly in the new platform in the actual vehicle driving environment. During the verification, the developers often need to perform debugging repeatedly based on actual conditions during the verification process. If the algorithm needs to be re-transplanted and run in the actual vehicle driving environment for each debugging, the expensive costs of the road test will add to the development costs. In addition, if the developers want to try different ideas during RNC development or RNC debugging, an RNC test has to be performed in a real vehicle for each idea and attempt, which will be very inconvenient. Currently, there is no available method or system to simulate an RNC system operating in an actual vehicle environment. Therefore, it is necessary to provide a simulation test system that can simulate an RNC running in an actual vehicle environment.

SUMMARY

A simulation test system for vehicle RNC is provided in one or more embodiments of the present disclosure. The simulation test system may include a vehicle RNC simulation system and a power amplifier. The vehicle RNC simulation system is configured to simulate an RNC system in a vehicle environment. The power amplifier is configured to execute an RNC algorithm and may perform data communication with the vehicle RNC simulation system. The vehicle RNC simulation system transmits acceleration data representing an acceleration signal and microphone data representing a microphone signal to the power amplifier as inputs to the RNC algorithm in the power amplifier. Moreover, the vehicle RNC simulation system may receive speaker data representing a speaker signal from the power amplifier. The vehicle RNC simulation system includes a secondary path simulation model and a signal flow simulation model.

A simulation test method for vehicle RNC is provided in one or more embodiments of the present disclosure. The method includes: constructing a vehicle RNC simulation system configured to simulate an RNC system in a vehicle environment; and executing an RNC algorithm by using a power amplifier in communication with the vehicle RNC simulation system. The vehicle RNC simulation system transmits acceleration data representing an acceleration signal and microphone data representing a microphone signal to the power amplifier as inputs to the RNC algorithm in the power amplifier, and receives, from the power amplifier, speaker data representing a speaker signal. The vehicle RNC simulation system includes a secondary path simulation model and a signal flow simulation model.

BRIEF DESCRIPTION OF THE DRAWINGS

The system can be better understood with reference to the following description and the accompanying drawings. The parts in the drawings are not drawn to scale but focus on explaining principles of the present disclosure. In addition, in the drawings, similar or identical reference numerals represent similar or identical elements.

DETAILED DESCRIPTION

It should be understood that the following description of the embodiments is given for illustrative purposes only, and not restrictive. The division of examples among the functional blocks, modules, or units shown in the accompanying drawings should not be construed as indicating that these functional blocks, modules, or units must be implemented as physically separated units. The functional blocks, modules, or units shown or described may be implemented as separate units, circuits, chips, or circuit elements. One or more functional blocks or units may also be implemented in a common circuit, chip, circuit element, or unit.

The road noise cancellation (RNC) technology is used to reduce undesired road noise in a vehicle compartment. Generally, in an actual vehicle environment, an RNC system collects a vibration sensor signal and a microphone signal as inputs to the RNC system. Then, the RNC system will generate sound waves ideally having the opposite phase and the same magnitude as the road noise, thereby helping to eliminate or reduce the road noise in a cab. For example, a noise signal received by a microphone installed in a specific area of a compartment is input to an in-vehicle power amplifier, and the power amplifier uses its internal RNC algorithm to make an in-vehicle speaker emit a waveform that has a phase opposite to that of the noise. Due to the interference effect of the waves, the sound waves having the two opposite phase waveforms will cancel each other when they meet in the air, thereby greatly reducing the noise level in the compartment. The microphone installed in the vehicle can continuously monitor and measure the noise conducted by the power system or road into the compartment, and real-time regulate the loudspeaker to emit antiphase waves, so that occupants in the vehicle can get rid of the noise interference when the vehicle is running.

The simulation test system of one or more embodiments of the present disclosure can realize the simulation of an RNC process in the above vehicle environment, so that the development of the RNC algorithm or the transplantation and debugging process of the algorithm of research personnel becomes more convenient and effective. Before testing in an actual vehicle, the simulation system or method of the present disclosure may be used to debug or verify the algorithm offline, without requiring every debugging and verification in the actual vehicle environment, thereby saving road test costs and increasing the development efficiency.

Figure 1:
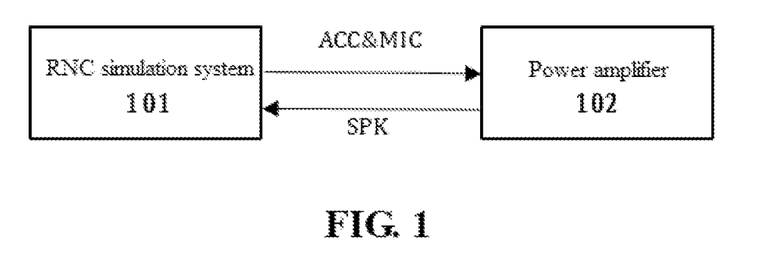
FIG. 1 schematically shows a block diagram of a simulation test system for vehicle RNC according to one or more embodiments of the present disclosure.

FIG. 1 schematically shows a block diagram of a simulation test system for vehicle RNC according to one or more embodiments of the present disclosure. As shown in FIG. 1, simulation test system 100 for vehicle RNC includes vehicle RNC simulation system 101 and power amplifier 102 that can perform data communication with vehicle RNC simulation system 101. Vehicle RNC simulation system 101 is configured to simulate an operation of an RNC system in an actual vehicle environment. Power amplifier 102 is configured to execute the RNC algorithm. Power amplifier 102 may be an in-vehicle power amplifier to be used in an actual vehicle, or may be a test power amplifier only used in a simulation test system. Herein, the power amplifier may also be referred to as an RNC power amplifier or RNC Box. Vehicle RNC simulation system 101 may transmit acceleration (ACC) data and microphone (MIC) data to power amplifier 102. The acceleration data may represent an acceleration signal collected by a vibration sensor in the actual vehicle environment, and the microphone data may represent a vehicle microphone signal collected by the microphone installed in the vehicle in the actual vehicle environment. In the process of testing the RNC algorithm, the acceleration data and the microphone data may be used as inputs of the RNC algorithm running in power amplifier 102.

For example, the acceleration data and the microphone data may be selected from a pre-prepared data set. Data in the data set may be data collected and stored in an actual vehicle driving environment, or related data generated by a simulation system, or a combination of the two. Vehicle RNC simulation system 101 may receive speaker data representing a speaker signal from power amplifier 102. For example, the speaker data may be data generated by the RNC algorithm running in power amplifier 102.

In one or more embodiments of the present disclosure, vehicle RNC simulation system 101 may be implemented in a computing apparatus or an embedded power amplifier. The computing apparatus may include, for example, a computer, a portable computer, an intelligent mobile apparatus, and any device having a CPU, a processor, or a processing chip that can run a program. In addition, in one or more embodiments of the present disclosure, data transmission between vehicle RNC simulation system 101 and power amplifier 102 may be performed by using an Automotive Audio Bus (A2B) bus. The A2B bus can support transmission of up to 28 channels of data in real time at a fixed sampling rate of 48 kHz, for example. In one or more embodiments of the present disclosure, the vehicle RNC simulation test system may support the following RNC configurations by taking a sampling rate of 48 kHz as an example: up to 12 acceleration (ACC) signals; up to 8 microphones (MIC) signal; and up to 8 speaker (SPK) signals. The present disclosure adopts the A2B bus to transmit data, which may meet the real-time and high-speed transmission of a large amount of data, so that the test simulation system of the present disclosure can be closer to the RNC in the actual vehicle environment.

Figure 2:
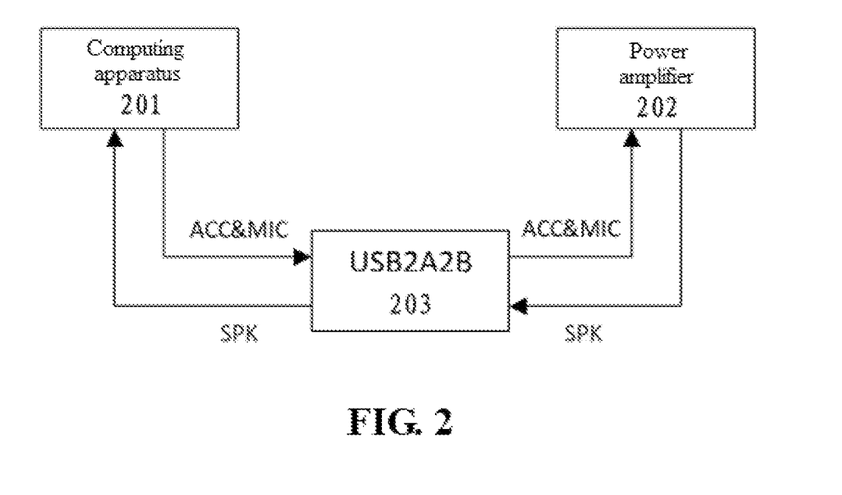
FIG. 2 schematically shows a simulation test system for vehicle RNC according to one or more embodiments of the present disclosure, wherein the vehicle RNC simulation system is implemented by a computing apparatus.

FIG. 2 schematically shows a simplified diagram of a simulation test system for implementing a simulation system of vehicle RNC by a computing apparatus 201. Generally, because most computing apparatuses use a Universal Serial Bus (USB) interfaces for data transmission, a USB2A2B interface apparatus (USB2A2B Box) 203 is additionally used between the computing apparatus 201 and the power amplifier 202 to meet the requirements of data transmission between the computing apparatus 201 and the power amplifier 202 using the A2B bus. As shown in FIG. 2, the computing apparatus 201 and RNC power amplifier 202 communicate ACC data, MIC data, and SPK data through USB2A2B interface apparatus (USB2A2B Box) 203.

Figure 3:
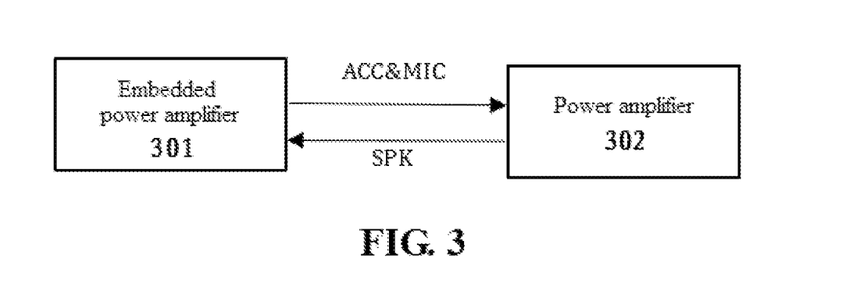
FIG. 3 schematically shows a simulation test system for vehicle RNC according to one or more embodiments of the present disclosure, wherein the vehicle RNC simulation system is implemented by an embedded power amplifier.

FIG. 3 schematically shows a simplified diagram of a simulation test system for implementing a simulation system of vehicle RNC by an embedded power amplifier 301. The embedded power amplifier 301 itself has an A2B interface, and therefore, FIG. 3 illustrates direct data transmission between the embedded power amplifier 301 and the power amplifier 302 that can execute the RNC algorithm (also known as the RNC power amplifier or RNC Box) without the need of the additional USB2A2B interface apparatus as shown in FIG. 2. As shown in FIG. 3, the embedded power amplifier 301 may transmit ACC data and MIC data to RNC power amplifier 302 through the A2B bus. Similarly, the RNC power amplifier 302 may transmit SPK data to the embedded power amplifier 301 through the A2B bus.

Figure 4:
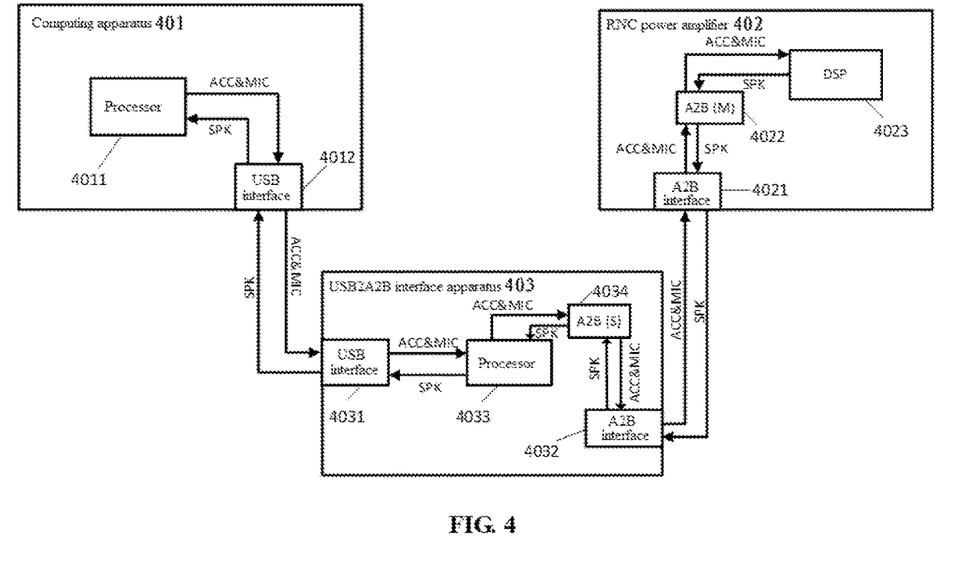
FIG. 4 schematically shows a simulation test system for vehicle RNC according to one or more embodiments of the present disclosure corresponding to FIG. 2, wherein more details are shown.
Figure 5:
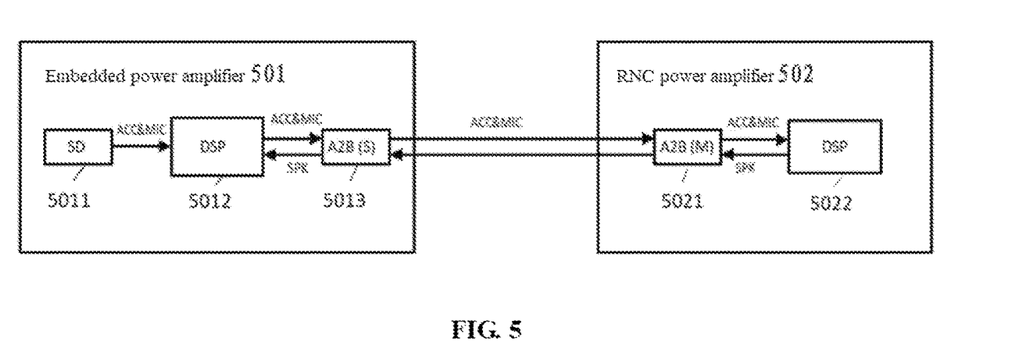
FIG. 5 schematically shows a simulation test system for vehicle RNC according to one or more embodiments of the present disclosure corresponding to FIG. 3, wherein more details are shown.

FIG. 4 and FIG. 5 show detailed schematic diagrams of the simulation test system based on FIG. 2 and FIG. 3, respectively. Referring to FIG. 4, computing apparatus 401 may include CPU or processor 4011, and the simulation test method of one or more embodiments of the present disclosure may be performed by the CPU or the processor 4011 running a simulation test application. The computing apparatus 401 sends ACC data and MIC data to USB2A2B interface apparatus 403 via USB interface 4012 included therein. The USB2A2B interface apparatus 403 includes two types of interfaces, for example, a USB interface 4031 and an A2B interface 4032. The USB interface 4031 is configured to receive ACC data and MIC data from the computing apparatus 401 and transmits the received data to A2B interface 4021 of RNC power amplifier 402 via A2B interface 4032 through processor 4033 and slave A2B chip (A2B(S)) 4034 in turn. The ACC data and MIC data received from A2B interface 4021 are transmitted to digital signal processor DSP 4023 via master A2B chip (A2B(M)) 4022 as input data of the RNC algorithm loaded in DSP 4023. Conversely, the SPK data generated by the RNC algorithm loaded in DSP 4023 may be transmitted to computing apparatus 401 via USB2A2B interface apparatus 403 in an opposite data flow direction described above.

FIG. 4 simply illustrates a simulation test system for implementing a simulation system of vehicle RNC by a computing apparatus, so as to briefly illustrate data stream transmission through the USB2A2B interface apparatus. Those skilled in the art may understand that computing apparatuses, USB2A2B interface apparatuses, and power amplifier apparatuses including other components or units are all within the scope of the present disclosure. For example, computing apparatus 401 may also include a memory configured to store initial data sets of ACC data and MIC data, and/or store any data generated in computing of the system model, for example. Computing apparatus 401 may further process the data through the processor.

FIG. 5 schematically shows a simulation test system for implementing a simulation system for vehicle RNC by an embedded power amplifier. With reference to FIG. 5, an embedded power amplifier 501 may include memory 5011 (such as an SD memory card) for storing ACC data and MIC data, a digital signal processor (DSP) 5012, and slave A2B chip (A2B(S)) 5013. An RNC power amplifier 502 includes master A2B chip (A2B(M)) 5021 and digital signal processor DSP 5022. For example, the digital signal processor DSP 5012 in the embedded power amplifier 501 can run the vehicle road cancellation simulation method and system according to one or more embodiments of the present disclosure. The DSP 5021 included in the RNC power amplifier 502 may be used to run the RNC algorithm. Through A2B(S) 5013 and A2B(M) 5021, the embedded power amplifier 501 and the RNC power amplifier 502 may directly communicate ACC data, MIC data, and SPK data through the A2B bus.

Figure 6:
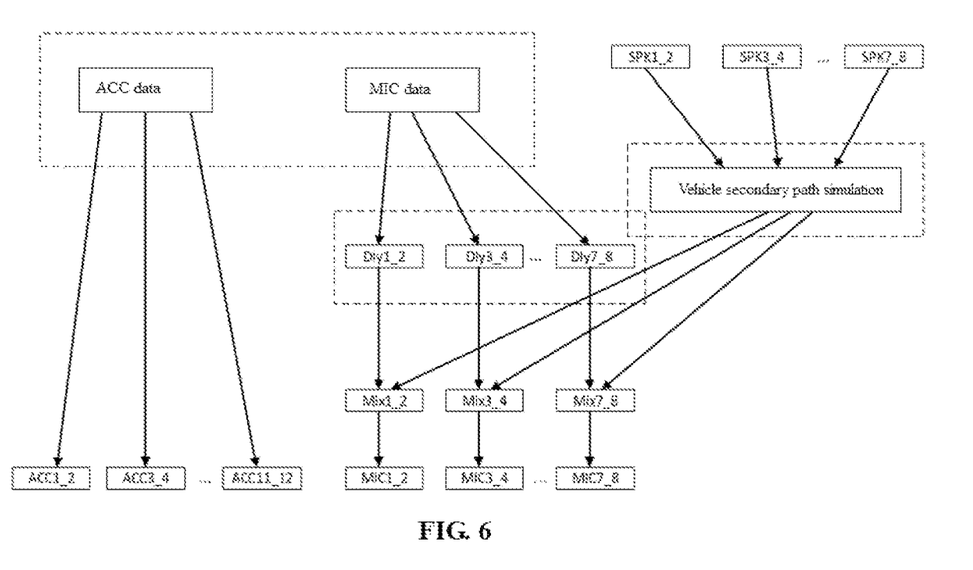
FIG. 6 exemplarily shows a schematic diagram of signal flow simulation according to one or more embodiments of the present disclosure.

How the vehicle RNC simulation system implemented by a computing apparatus or an embedded power amplifier realizes modeling of road cancellation of an actual vehicle environment will be introduced below. FIG. 6 exemplarily shows a schematic diagram of a signal flow simulation model in a vehicle RNC simulation system according to one or more embodiments of the present disclosure. In the vehicle RNC simulation system, the signal flow simulation model uses transmission control of a data stream to simulate a signal flow in the road cancellation in the actual vehicle environment.

As shown in FIG. 6, different transmission modes are used to model ACC data and MIC data. The ACC data may be sent directly to A2B channels. For example, the ACC data is directly sent to channels ACC1_2, ACC3_4, . . . , and ACC11_12 allocated to the ACC data in the A2B channels. As for the MIC data, it must first be delayed in a delay module. The delay module includes Dly1_2, Dly3_4, . . . , and Dly7_8 modules shown in FIG. 6. The delayed MIC data is sent to a mixing module, for example, Mix1_2, Mix3_4, . . . , and Mix7_8 modules as shown in the drawing.

The mixing module may include an adder for adding the MIC data representing the noise and the SPK data passing through the secondary path to obtain final reduced road noise, that is, the noise heard by the human ear in the vehicle. The other path of input data of the mixing module is the speaker data processed by the vehicle secondary path simulation model. The speaker data SPK1_2, SPK3_4, . . . , and SPK7_8 is received by the vehicle road noise simulation system from the power amplifier through the A2B channels. The vehicle secondary path simulation model will be further explained below. Then, the delayed MIC data is mixed with the SPK data processed (for example, filtered) by the vehicle secondary path simulation model, and the mixed data is correspondingly transmitted to the channels MIC1_2, MIC3_4, . . . , and MIC7_8 allocated to the MIC data among the A2B channels. The ACC data and the MIC data may be, for example, data pre-stored in the vehicle RNC simulation system. The data may be data collected through a power amplifier in the actual vehicle driving environment. For example, the power amplifier may collect the ACC data and the MIC data at a sampling rate of, for example, 48 kHz.

Figure 7:
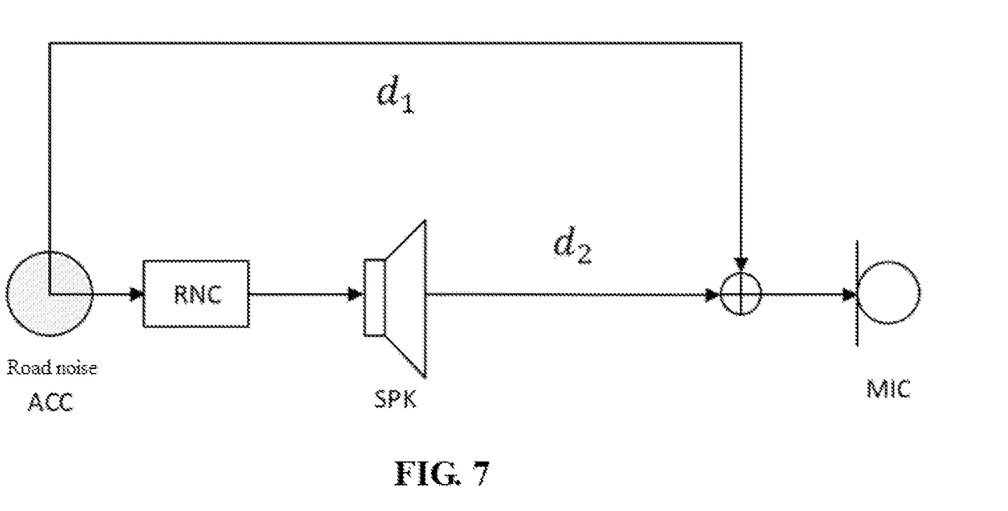
FIG. 7 exemplarily shows a schematic diagram of a delay principle in an actual vehicle environment.

The delay compensation in the delay module in the above signal flow simulation process will be further described below with reference to FIG. 7. FIG. 7 exemplarily shows a schematic diagram of the delay in an actual vehicle environment. As shown in FIG. 7, the delay between the ACC signal and the MIC input is denoted as $d_1$, and the delay between the SPK signal and the MIC input is denoted as $d_2$. Only if $d_1 > d_2$, the RNC in the actual vehicle can work correctly.

For the vehicle RNC simulation system in one or more embodiments of the present disclosure, the delay between transmission of the ACC data and transmission of the MIC data is expressed as $d_1 + d_{com}$. Here, $d_{com}$ is the delay compensation used in the delay module that delays the MIC data in FIG. 6. The delay between SPK data and MIC data is expressed as $d_2 + d_{mic\_ch\_delay}$, where $d_{mic\_ch\_delay}$ is the microphone channel delay. For the vehicle RNC simulation test system based on the computing apparatus, $d_{mic\_ch\_delay}$ is mainly considered as an audio stream input/output (ASIO) output delay of the USB2A2B conversion interface apparatus. For the vehicle RNC simulation test system based on the embedded power amplifier, the value of $d_{mic\_ch\_delay}$ is very small and is mainly the A2B channel delay. By setting the compensation delay $d_{com}$ for the MIC signal, the RNC in the vehicle RNC simulation test system can work normally. That is, by setting $d_{com}$, when the following conditions are met, the simulation RNC in the simulation test system can work normally:

$$d_1 + d_{com} > d_2 + d_{mic\_ch\_delay}$$

wherein $d_{com}$ may be selectively set based on whether the vehicle RNC simulation system is implemented by a computing apparatus or an embedded power amplifier.

How to construct the vehicle secondary path simulation model in the vehicle RNC simulation system will be described in detail below with reference to FIG. 8. Usually, the RNC power amplifier may calculate a secondary path of the vehicle at a sampling rate processed by the RNC. In order to facilitate the explanation of the principle, the simulation test system using a sampling rate of 48 kHz is used as an example for the following description. Those skilled in the art can understand that different data sampling rates may be selected for the simulation test system according to actual operation requirements, for example, using the A2B bus to transmit data with a real-time sampling rate other than 48 kHz. In the case of establishing a vehicle RNC simulation system by using a sampling rate of 48 kHz, the RNC processing sampling rate is usually less than 48 kHz.

Figure 8:
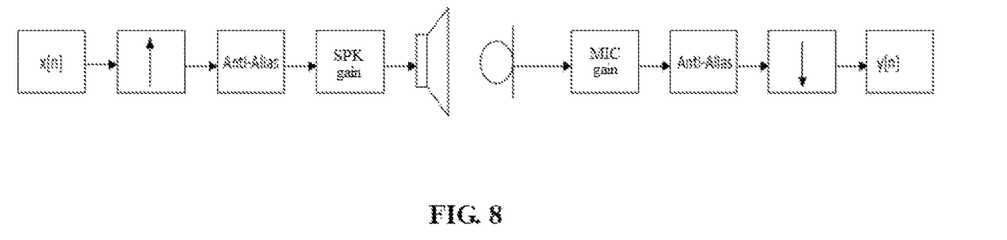
FIG. 8 exemplarily shows a schematic diagram of a secondary path principle of a vehicle according to one or more embodiments of the present disclosure.

FIG. 8 schematically shows a schematic diagram of the principle of vehicle secondary path computing performed in the RNC power amplifier in the vehicle. As shown in FIG. 8, an input signal x(n) on the speaker side enters the speaker after passing through an up-sampling module, an Anti-Alias filter module, and an SPK gain module, and the output of the microphone side passes through an MIC gain module, an Anti-Alias filter module, and a down-sampling module sequentially, and y(n) is finally output as an output signal. The vehicle secondary path (also referred to as a transfer function of the secondary path), that is, a speaker-to-microphone transfer function may be calculated as:

$$H(k) = \frac{Y(k)}{X(k)} = \frac{FFT(y[n])}{FFT(x[n])}$$

Y(k) and X(k) are the Fourier transform of the input signal x(n) and the output signal y(n), respectively. When the vehicle secondary path simulation model in the vehicle RNC simulation system is constructed, it is also necessary to adopt a frequency response from the speaker to the microphone, that is, the transfer function. Based on the vehicle secondary path computing principle in FIG. 7, the vehicle secondary path simulation model in the vehicle RNC simulation system may be established as the following formula:

$$2ndPath_{RNC} = \frac{H(k)}{H_{anti\text{-}alias}(k) \times H_{anti\text{-}alias}(k) \times spkGain \times micGain}$$

wherein $H_{anti\text{-}alias}(k)$ is the frequency response of the Anti-Alias filter. At this time, the secondary path of the vehicle is calculated at the sampling rate of the RNC processing. As mentioned above, in this example description, the RNC processing sampling rate is less than 48 kHz, and the sampling rate used in the vehicle RNC simulation system that is intended to model and simulate is, for example, 48 kHz. Therefore, further sampling rate conversion processing is required. By using the following sampling rate conversion, the vehicle secondary path (that is, the speaker-to-microphone transfer function) at the sampling rate of 48 kHz used in the vehicle RNC simulation system may be obtained:

$$2ndPath_{49\ kHz} = resample(2ndPath_{RNC}, FS_{sim}, FS_{RNC})$$

wherein $FS_{sim}$ is the sampling rate of the vehicle road cancellation simulation system, such as 48 kHz; and $FS_{RNC}$ is the sampling rate of RNC processing, such as a sampling rate less than 48 kHz.

Thus, the vehicle secondary path simulation model data suitable for the vehicle RNC simulation system is obtained. The data for the vehicle secondary path simulation model is loaded into the vehicle RNC simulation system to construct the vehicle secondary path simulation model in the simulation system.

Figure 9:
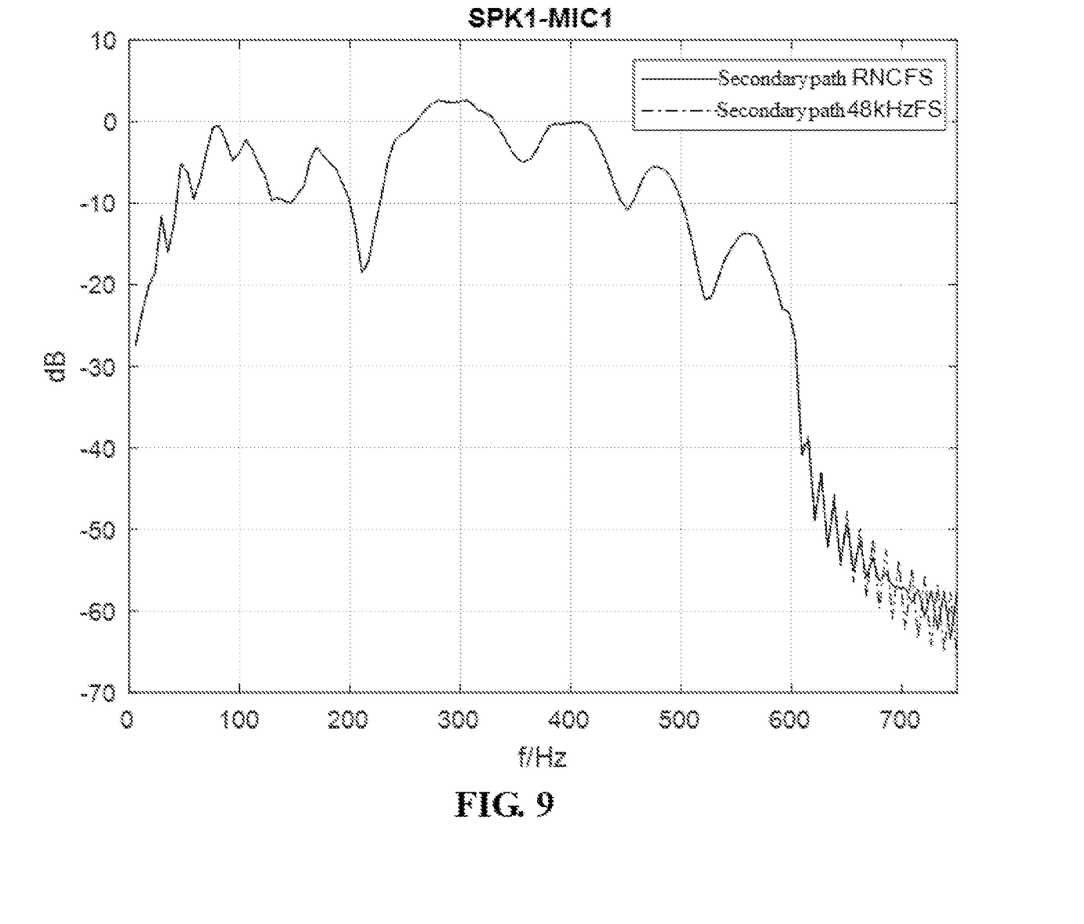
FIG. 9 exemplarily shows a schematic diagram of comparison between a secondary path data result generated by a secondary path model included in a simulation test system for vehicle RNC according to one or more embodiments of the present disclosure with a secondary path data result in an actual vehicle environment.

In order to verify the simulation effect of the vehicle secondary path simulation model in the vehicle RNC simulation system, the RNC power amplifier may be used to measure the vehicle secondary path in the vehicle RNC simulation system. FIG. 9 exemplarily shows a schematic diagram of comparison between a secondary path data result generated by a secondary path model in a simulation test system for vehicle RNC according to one or more embodiments of the present disclosure with a secondary path data result in an actual vehicle environment. The comparison diagram uses the response of SPK1 to MIC1 as an example for comparison. As can be seen from the comparison diagram in FIG. 8, the secondary path results in the simulation system have a high degree of fit with the secondary path results measured by the actual vehicle.

Figure 10:
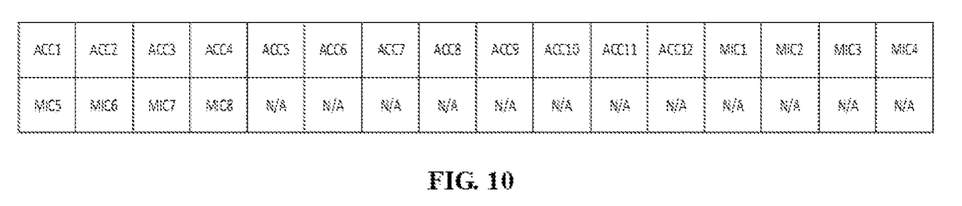
FIG. 10 exemplarily shows a schematic diagram of channel mapping/allocation of an A2B downstream channel according to one or more embodiments of the present disclosure.
Figure 11:
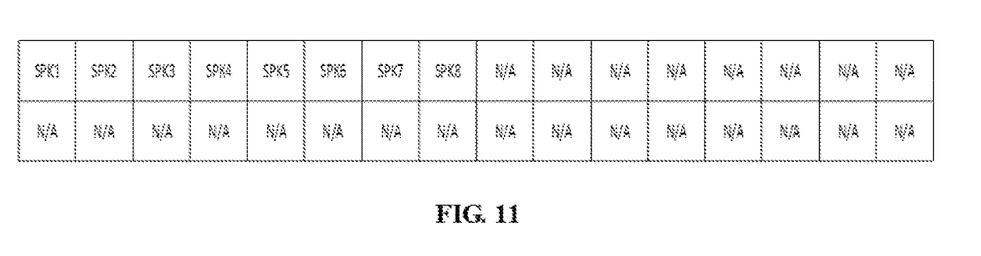
FIG. 11 exemplarily shows a schematic diagram of channel mapping/allocation of an A2B upstream channel according to one or more embodiments of the present disclosure.

FIG. 10 and FIG. 11 respectively exemplarily show a schematic diagram of channel mapping/allocation of A2B downstream and uplink channels according to one or more embodiments of the present disclosure. FIG. 10 shows the A2B channel from the computing apparatus or the embedded power amplifier to the RNC power amplifier, that is, the ACC data and the MIC data distribution included in the downstream channel. FIG. 11 shows the A2B channel from the RNC power amplifier to the computing apparatus or embedded power amplifier, that is, the SPK data distribution included in the upstream channel.

Figure 12:
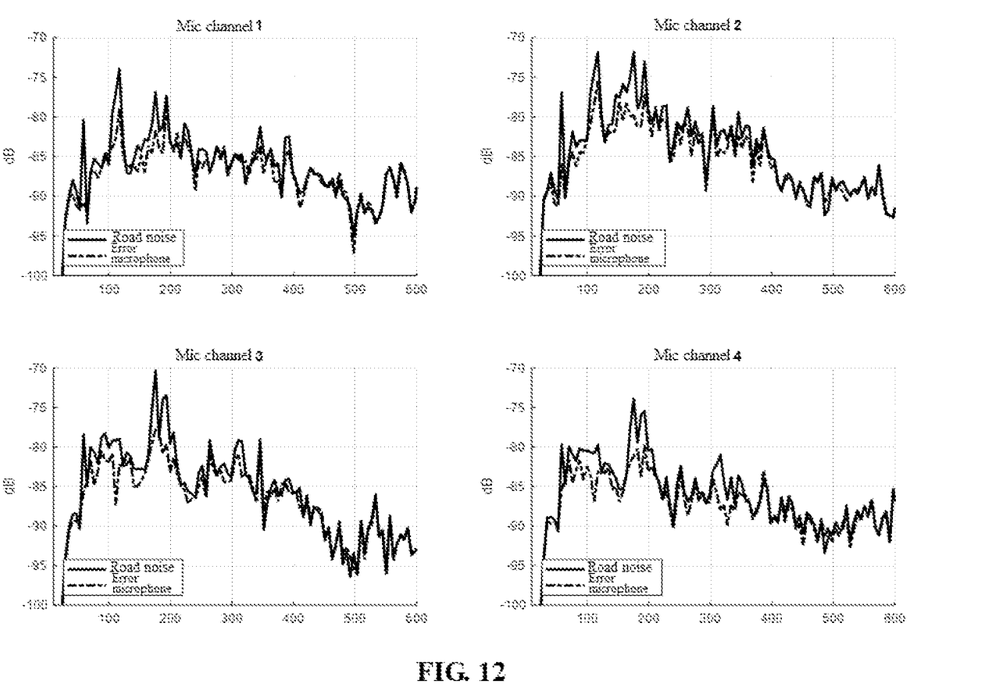
FIG. 12 shows a schematic diagram of a simulation RNC result obtained based on a simulation test system or method for vehicle RNC according to one or more embodiments of the present disclosure.

FIG. 12 shows a schematic diagram of a simulation of an RNC result obtained based on a simulation test system for vehicle RNC according to one or more embodiments of the present disclosure. For illustrative purposes, FIG. 12 shows a schematic diagram of data simulation of four MIC channels. The value of the abscissa represents the frequency (Hz), and the value of the ordinate represents the signal amplitude (dB). For RNC algorithm developers, an intuitive algorithm running result graph may be obtained through the simulation system of the present disclosure, so as to facilitate the developers to verify or further debug.

The simulation test system for vehicle RNC of the present disclosure can well simulate the RNC in the actual driving environment of the vehicle, and therefore, the simulation test system can provide RNC developers with additional flexible, efficient, and low-cost verification and debugging environment. For example, after transplanting an RNC algorithm to a new platform, a developer can use the vehicle RNC simulation test system of the present disclosure to verify whether the RNC works normally on the new platform before testing in the actual vehicle. Further, during RNC algorithm development or RNC debugging, the developer can use the simulation test system of the present disclosure to try different ideas, such as various attempts to improve the algorithm, instead of having to conduct a road test in an actual vehicle every time, which can greatly save time and improve the development efficiency. In addition, the simulation test system of the present disclosure establishes a simulation environment directly based on hardware components of the power amplifier. The developer can directly debug and verify the RNC algorithm running on the power amplifier while offline, without the need for multiple algorithm transplants and tests in the vehicle, thereby further saving time cost and road test cost and improving the development efficiency. At the same time, the vehicle RNC simulation test system of the present disclosure can also reproduce problems that occur in the actual vehicle environment, which can help the developer quickly fix the problems.

The various aspects of the present embodiment may be embodied as a system, a method, or a computer program product. Therefore, various aspects of the present disclosure may take the form of a complete hardware embodiment, a complete software embodiment (including firmware, resident software, microcode, etc.), or a combination of software and hardware embodiments, and the forms may be collectively referred to as "modules" or "systems." In addition, various aspects of the present disclosure may take the form of a computer program product embodied in one or more computer-readable media having computer-readable program code embodied thereon.

Any combination of one or more computer-readable media may be utilized. The computer-readable medium may be a computer-readable signal medium or a computer-readable storage medium. The computer-readable storage medium may be, for example, but not limited to, an electronic, magnetic, optical, electromagnetic, infrared, or semiconductor system, device or apparatus, or any suitable combination of the foregoing items. More specific examples of computer-readable storage media (non-exhaustive list) would include the following: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage apparatus, a magnetic storage apparatus, or any suitable combination of the above. In the context of this document, a computer-readable storage medium may be any tangible medium that can contain or store a program for use by an instruction execution system, device, or apparatus or used in conjunction with the instruction execution system, device, or apparatus.

The various aspects of the present disclosure are described above with reference to flowcharts/signal flow diagrams and/or block diagrams of methods, devices (systems) and computer program products according to embodiments of the present disclosure. It should be understood that each block in the flowchart/signal flow diagram and/or block diagram and a combination of blocks in the flowchart/signal flow diagram and/or block diagram may be implemented by computer program instructions. These computer program instructions may be provided to a processor of a general-purpose computer, a special-purpose computer, or a further programmable data processing device to produce a machine such that the instructions executed by the processor of the computer or further programmable data processing device enable the implementation of functions/actions specified in one or more blocks of the flowchart/signal flow diagram and/or block diagram. Such a processor may be but is not limited to a general-purpose processor, a special-purpose processor, an application-specific processor, or a field programmable processor.

The signal flow diagrams and block diagrams in the accompanying drawings illustrate the architecture, functionality, and operation of possible embodiments of systems, methods, and computer program products according to various implementations of the present disclosure. In this regard, each block in the signal flow diagram or block diagram may represent a module, segment, or part of code, and the code includes one or more executable instructions for implementing specified logical functions. It should also be noted that in some alternative implementations, the functions noted in the blocks may occur out of the order noted in the accompanying drawings. For example, two blocks shown in succession may actually be executed approximately simultaneously, or the blocks may sometimes be executed in reverse order, depending on the functionality involved. It should also be noted that each block in the block diagram and/or signal flow diagram, as well as the combination of the blocks in the block diagram and/or signal flow diagram, may be implemented by a dedicated hardware-based system or a combination of dedicated hardware and computer instructions that can execute specific functions or actions.

The description of the embodiments has been presented for the purposes of illustration and description. Appropriate modifications and changes of the embodiments may be implemented in view of the above description or may be obtained through practical methods. For example, unless otherwise indicated, one or more of the methods described may be performed by a combination of suitable apparatuses and/or systems. The method may be performed in the following manner: using one or more logic apparatuses (for example, processors) in combination with one or more additional hardware elements (such as storage apparatuses, memories, circuits, and hardware network interfaces) to perform storage instruction. The method and associated actions may also be executed in parallel and/or simultaneously in various orders other than the order described in the present application. The system is an example in nature and may include additional elements and/or omit elements. The subject matter of the present disclosure includes all novel and non-obvious combinations of the disclosed various methods and system configurations and other features, functions, and/or properties.

As used in the present application, an element or step recited in the singular form followed by the word "a" should be understood as not excluding a plurality of the elements or steps, unless such exclusion is specified. Furthermore, references to "one embodiment" or "an example" of the present disclosure are not intended to be interpreted as excluding the existence of additional embodiments that also incorporate the recited features. The terms "first," "second," "third," etc. are only used as identifiers, and are not intended to impose numerical requirements or specific positional orders on their objects.

Although various embodiments of the present invention have been described, those of ordinary skill in the art will appreciate that many embodiments and implementations are possible within the scope of the present invention. Specifically, those skilled will recognize the interchangeability of various features from different embodiments. Although these techniques and systems have been disclosed in the context of certain embodiments and examples, it will be understood that these techniques and systems can be extended beyond the specifically disclosed embodiments to other embodiments and/or uses and obvious modifications thereof.

The invention claimed is:

1. A simulation test system for vehicle road noise cancellation (RNC), comprising:
 a vehicle RNC simulation system configured to simulate an RNC system in a vehicle environment; and
 a power amplifier in communication with the vehicle RNC simulation system and configured to execute an RNC algorithm,
 wherein the vehicle RNC simulation system transmits acceleration data representing an acceleration signal and microphone data representing a microphone signal to the power amplifier as inputs to the RNC algorithm in the power amplifier, and receives, from the power amplifier, speaker data representing a speaker signal;
 wherein the vehicle RNC simulation system comprises a secondary path simulation model and a signal flow simulation model;
 wherein the secondary path simulation model is established by:
  measuring first secondary path data in the vehicle environment at a first data sampling rate;

obtaining second secondary path data at a second data sampling rate based on the first secondary path data; and loading the second secondary path data into the vehicle RNC simulation system to establish the secondary path simulation model, and wherein obtaining the second secondary path data at the second data sampling rate based on the first secondary path data further comprises:

determining third secondary path data at the first data sampling rate based on the first secondary path data and a speaker gain, a microphone gain, and filter parameters used in the measurement; and converting, by a sampling rate conversion, the third secondary path data at the first data sampling rate into the second secondary path data at the second data sampling rate for the vehicle RNC simulation system, wherein the first data sampling rate is less than the second data sampling rate.

2. The system of claim 1, wherein the vehicle RNC simulation system performs data communication with the power amplifier through an Automotive Audio Bus (A2B).

3. The system of claim 1, wherein the vehicle RNC simulation system is implemented in a computing apparatus or an embedded power amplifier.

4. The system of claim 1, wherein the signal flow simulation model is established by:

directly transmitting the acceleration data representing the acceleration signal to a first A2B channel;

delaying the microphone data representing the microphone signal;

processing the received speaker data by using the secondary path simulation model; and mixing the processed speaker data and the delayed microphone data to provide the mixed data and transmitting the mixed data to a second A2B channel.

5. The system of claim 4, wherein the delaying includes determining a delay compensation based on whether the vehicle RNC simulation system is implemented in a computing apparatus or an embedded power amplifier.

6. The system of claim 1, wherein the vehicle RNC simulation system further comprises a memory configured to store an initial data set comprising the acceleration data and the microphone data.

7. A simulation test method for vehicle road noise cancellation (RNC), the method comprising:

constructing a vehicle RNC simulation system configured to simulate an RNC system in a vehicle environment; and executing an RNC algorithm by using a power amplifier in communication with the vehicle RNC simulation system, wherein the vehicle RNC simulation system transmits acceleration data representing an acceleration signal and microphone data representing a microphone signal to the power amplifier as inputs to the RNC algorithm in the power amplifier, and receives, from the power amplifier, speaker data representing a speaker signal;

wherein the vehicle RNC simulation system comprises a secondary path simulation model and a signal flow simulation model;

wherein the secondary path simulation model is established by:

measuring first secondary path data in a vehicle environment at a first data sampling rate;

obtaining second secondary path data at a second data sampling rate based on the first secondary path data; and loading the second secondary path data into the vehicle RNC simulation system to establish the secondary path simulation model; and wherein the obtaining the second secondary path data at the second data sampling rate based on the first secondary path data further includes:

calculating third secondary path data at the first data sampling rate based on the first secondary path data and a speaker gain, a microphone gain, and filter parameters used in the measurement; and converting, by a sampling rate conversion, the third secondary path data at the first data sampling rate into the second secondary path data at the second data sampling rate for the vehicle RNC simulation system, wherein the first data sampling rate is less than the second data sampling rate.

8. The method of claim 7, wherein the vehicle RNC simulation system performs data communication with the power amplifier through an Automotive Audio Bus (A2B).

9. The method of claim 7, wherein the vehicle RNC simulation system is implemented in a computing apparatus or an embedded power amplifier.

10. The method of claim 7, wherein the signal flow simulation model is established by:

directly transmitting the acceleration data representing the acceleration signal to a first A2B channel;

delaying the microphone data representing the microphone signal;

processing the received speaker data by using the secondary path simulation model; and mixing the processed speaker data and the delayed microphone data to provide mixed data and transmitting the mixed data a second A2B channel.

11. The method of claim 10, wherein the delaying comprises determining a delay compensation based on whether the vehicle RNC simulation system is implemented in a computing apparatus or an embedded power amplifier.

12. A computer program product embodied in a non-transitory computer read-able medium executable by a processor and that is programmed to provide a simulation test system for vehicle road noise cancellation (RNC), the computer-program product comprising instructions and being executable by the processor for:

constructing a vehicle RNC simulation system configured to simulate an RNC system in a vehicle environment; and executing an RNC algorithm by using a power amplifier in communication with the vehicle RNC simulation system, wherein the vehicle RNC simulation system transmits acceleration data representing an acceleration signal and microphone data representing a microphone signal to the power amplifier as inputs to the RNC algorithm in the power amplifier, and receives, from the power amplifier, speaker data representing a speaker signal;

wherein the vehicle RNC simulation system comprises a secondary path simulation model and a signal flow simulation model;

wherein the secondary path simulation model is established by:

measuring first secondary path data in a vehicle environment at a first data sampling rate;

obtaining second secondary path data at a second data sampling rate based on the first secondary path data; and loading the second secondary path data into the vehicle RNC simulation system to establish the secondary path simulation model; and wherein obtaining the second secondary path data at the second data sampling rate based on the first secondary path data further includes:

calculating third secondary path data at the first data sampling rate based on the first secondary path data and a speaker gain, a microphone gain, and filter parameters used in the measurement; and converting, by a sampling rate conversion, the third secondary path data at the first data sampling rate into the second secondary path data at the second data sampling rate for the vehicle RNC simulation system, wherein the first data sampling rate is less than the second data sampling rate.

13. The computer program product of claim 12, wherein the vehicle RNC simulation system performs data communication with the power amplifier through an Automotive Audio Bus (A2B).

14. The computer program product of claim 12, wherein the signal flow simulation model is established by:

directly transmitting the acceleration data representing the acceleration signal to a first A2B channel;

delaying the microphone data representing the microphone signal;

processing the received speaker data by using the secondary path simulation model; and mixing the processed speaker data and the delayed microphone data to provide mixed data and transmitting the mixed data to a second A2B channel.

* * * * *